US006967954B2

(12) United States Patent
Sugiyama

(10) Patent No.: US 6,967,954 B2
(45) Date of Patent: Nov. 22, 2005

(54) ATM EDGE NODE SWITCHING EQUIPMENT UTILIZED IP-VPN FUNCTION

(75) Inventor: Kazuhiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 834 days.

(21) Appl. No.: 09/740,979

(22) Filed: Dec. 21, 2000

(65) Prior Publication Data

US 2001/0005381 A1 Jun. 28, 2001

(30) Foreign Application Priority Data

Dec. 27, 1999 (JP) ................................ 11-371059

(51) Int. Cl.[7] ................................ H04L 12/56
(52) U.S. Cl. ................................ 370/395.52; 370/395.1
(58) Field of Search ................................ 370/395.1–395.52, 370/396, 397, 398, 399

(56) References Cited

U.S. PATENT DOCUMENTS 6,337,863 B1 * 1/2002 Nair et al. ............. 370/395.53
6,381,244 B1 * 4/2002 Nishimura et al. .... 370/395.21
6,614,791 B1 * 9/2003 Luciani et al. ......... 370/395.53
6,636,516 B1 * 10/2003 Yamano ................ 370/395.52
6,693,878 B1 * 2/2004 Daruwalla et al. .......... 370/235
2001/0055313 A1 * 12/2001 Yin et al. ................... 370/466
2002/0097675 A1 * 7/2002 Fowler et al. .............. 370/230
2003/0202481 A1 * 10/2003 Pillar et al. ................. 370/252

FOREIGN PATENT DOCUMENTS

JP 11-284664 10/1999

OTHER PUBLICATIONS

Article—The Institute of Electronics, Information and Communication Engineers, Mar. 19, 1999, vol. 98, pp. 75-80.

* cited by examiner

*Primary Examiner*—Frank Duong
*Assistant Examiner*—Michael J. Moore
(74) *Attorney, Agent, or Firm*—Foley & Lardner LLP

(57) ABSTRACT

ATM edge node switching equipment utilizes an IIP-VPN function, which can achieve a low cost VPN compared with an L2-VPN in which a user terminal is connected to the ATM edge node switching equipment by a mesh connection. This connection is provided, by connecting the user terminal and the ATM edge node switching equipment with one leased line. The ATM edge node switching equipment has an IP data packet distribution unit, which distributes each of IP data packets to each of the plural user terminals, by utilizing a IP-VPN unit using a destination IP address of each of the plural user terminals. The IP-VPN unit has an inputted IP data packet analyzing section that obtains an input VC (virtual channel) number and also obtains a VPN-ID (virtual private network-identifier) for distinguishing each of the user terminals and a QOS (quality of service) type set by QOS information from a header part of the IP data packet transferred from one of the user terminals. The IP-VPN device also has a routing information retrieving section that retrieves a routing of a VC for a destination address by using the destination IP address, the VPN-ID, and the QOS type, and sets the routing of the VC for the destination address.

6 Claims, 9 Drawing Sheets

F I G. 4
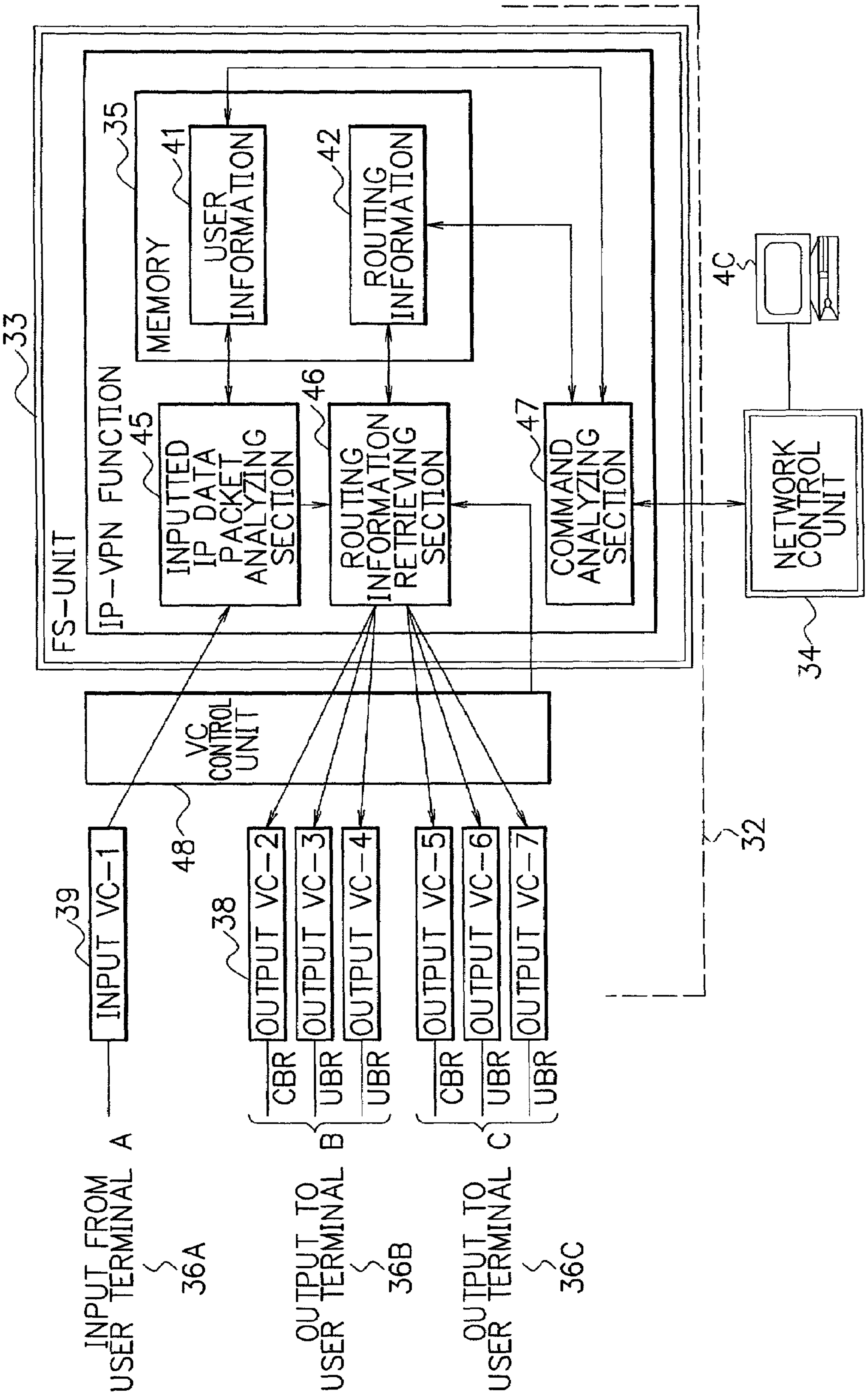

FIG. 5

| VPN-ID (51) | QOS TYPE (52) | INPUT VC NUMBER (53) | PROTOCOL TYPE (54) | DESTINATION SERVICE PORT NUMBER (55) | SOURCE ADDRESS SERVICE PORT NUMBER (56) | CODE POINT (57) |
|---|---|---|---|---|---|---|
| 1 | 0 | VC-1 | – | – | – | – |
| 1 | 1 | VC-1 | 6(TCP) | 80(http) | – | – |
| 1 | 2 | VC-1 | 6(TCP) | 21(ftp) | – | – |
| 1 | 3 | VC-1 | – | – | – | 101110 |
| : | : | : | : | : | : | : |
| 1 | 6 | VC-1 | 17(UDP) | – | 512(RIP) | – |
| 1 | 7 | VC-1 | 6(TCP) | 25(smtp) | – | – |
| : | : | : | : | : | : | : |

QOS INFORMATION 58 (columns 54–57)

FIG. 6

| 1ST OUTPUT VC NUMBER (61) | 2ND OUTPUT VC NUMBER (62) | OUTPUT VC STATE (63) | DESTINATION IP ADDRESS (64) | VPN-ID (65) | QOS TYPE (66) | |
|---|---|---|---|---|---|---|
| VC-3 | – | 1ST OUTPUT VC | 192.168.20.0 | 1 | 0 | OUTPUT TO USER TERMINAL B |
| VC-2 | VC-4 | 1ST OUTPUT VC | 192.168.20.0 | 1 | 1 | |
| VC-3 | – | 1ST OUTPUT VC | 192.168.20.0 | 1 | 2 | |
| VC-2 | VC-4 | 1ST OUTPUT VC | 192.168.20.0 | 1 | 3 | |
| : | : | : | : | : | : | |
| VC-3 | – | 1ST OUTPUT VC | 192.168.20.0 | 1 | 6 | |
| VC-3 | – | 1ST OUTPUT VC | 192.168.20.0 | 1 | 7 | |
| VC-6 | – | 1ST OUTPUT VC | 192.168.30.0 | 1 | 0 | OUTPUT TO USER TERMINAL C |
| VC-5 | VC-7 | 2ND OUTPUT VC | 192.168.30.0 | 1 | 1 | |
| VC-6 | | TROUBLE | 192.168.30.0 | 1 | 2 | |
| VC-5 | VC-7 | 2ND OUTPUT VC | 192.168.30.0 | 1 | 3 | |
| : | : | : | : | : | : | |
| VC-6 | – | TROUBLE | 192.168.30.0 | 1 | 6 | |
| VC-6 | – | TROUBLE | 192.168.30.0 | 1 | 7 | |
| : | : | : | : | : | : | |

67 68 69

F I G. 9
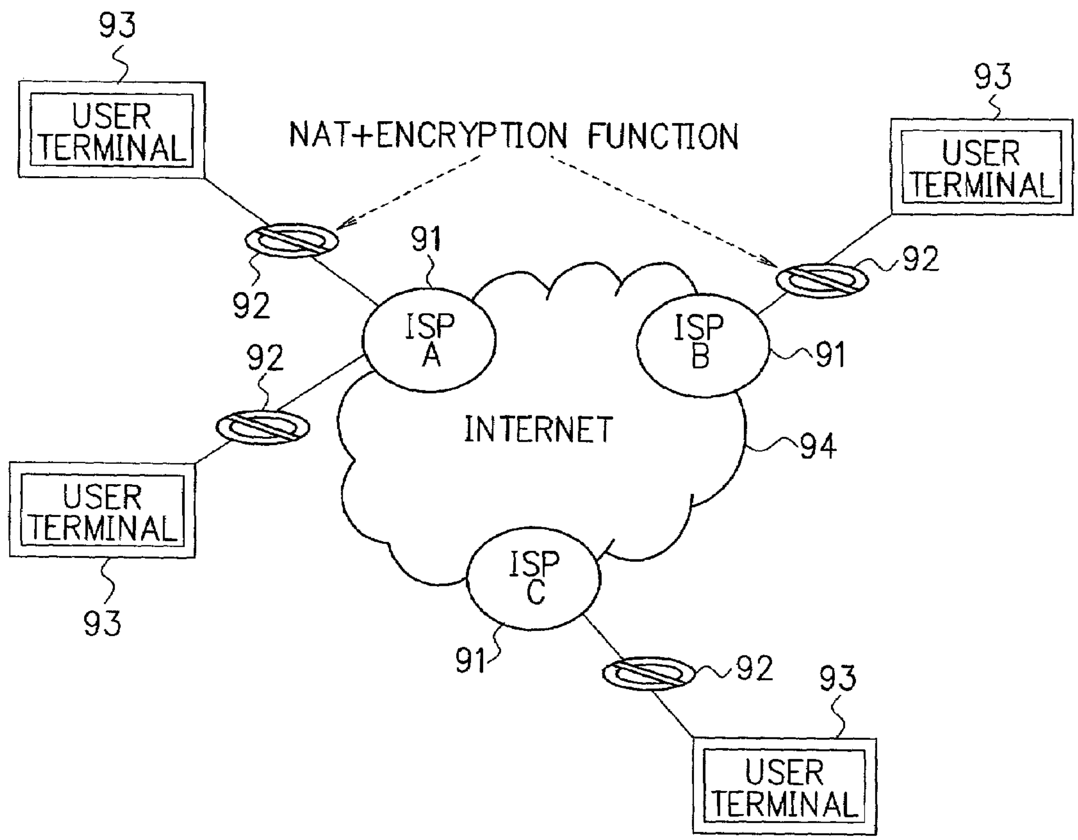

ATM EDGE NODE SWITCHING EQUIPMENT UTILIZED IP-VPN FUNCTION

BACKGROUND OF THE INVENTION

The present invention relates to ATM (asynchronous transfer mode) edge node switching equipment that provides a function to distribute IP (Internet protocol) data packets to each of destination IP addresses by utilizing an IP-VPN (Internet protocol-virtual private network) function.

1. Description of the Related Art

Recently the Internet has been widely used by utilizing a TCP/IP (transmission control protocol/Internet protocol) in a network of computers. At the Internet, aimed information linked to a WWW (world wide web) can be obtained by using a hyper text through a public network or a leased line.

On the other hand, a LAN (local area network) board being capable of corresponding to an ATM, which is expected to utilize in the future as a back born at the Internet, has begun to be released. The ATM is a data transmission and exchanging technology that is adopted at a next generation public network being a B-ISDN (broad band integrated services digital network). At the ATM, a data packet is called as an ATM cell, and the ATM cell is a 53 byte fixed length packet including a 5 byte header part providing control information for the destination and source address. In this header part, detecting/correcting codes are not included. This ATM cell is transferred from a user terminal to switching equipment, and the switching equipment reads a destination in the header part and transfers the ATM cell to a designated destination user terminal. When the ATM cell is transferred, the ATM cell is stored in the switching equipment temporarily, therefore communication among user terminals whose transmission rates are different is possible. And at the ATM, before starting the communication, the user terminals and switching equipment can secure the transmission bandwidth beforehand. Therefore, it is suitable to transfer streaming data, in which a part of a file being such as audio and video data can be reproduced in the ATM.

And generally, the public network is used at the Internet, but in order to secure the security, by making the public network be a private network like a leased line by utilizing a VPN (virtual private network), a system, in which data transferring through the public network are encrypted, has been gradually used.

Recently a small size business office such as a SOHO (small office home office) has increased, and an instrument, based on an L3-VPN corresponding to the layer 3 of network layers of an OSI (open system interconnection) referring model utilized the Internet, has increased. However, there is a problem that the assurance of quality of service (QOS) such as securing the communication bandwidth in the Internet at the public network can not be achieved.

In order to secure the assurance of the QOS completely, a user must contract with a communication carrier who operates and manages the network for a leased line of the network access layer or an L2-VPN leased line being the layer 2 of physical layer. However, in case of contracting the L2-VPN leased line, when the number of user terminals to be connected to the network increases, the number of the leased lines also increases, and this causes a high cost.

FIG. 1 is a diagram showing a conventional structure of an ATM network used the L2-VPN. As shown in FIG. 1, at a conventional ATM network 10, plural ATM edge node switching equipment 13 is provided, and plural user terminals 11 are connected to each of the plural ATM edge node switching equipment 13 by a mesh connection 12. In this ATM network 10, there is a leased line service transferring an IP data packet, however, the leased line, which connects the plural user terminals 11 and the ATM edge node switching equipment 13, is the L2-VPN system being the mesh connection, consequently, this causes a high cost.

SUMMARY OF THE INVENTION

It is therefore an object of the present invention to provide ATM edge node switching equipment, which can achieve a low cost VPN positioning in between the L2-VPN and the L3-VPN. With this, the communication carrier can install the ATM edge node switching equipment in an ATM network, and a user who is now using the L3-VPN or plans to use the L3-VPN can use the VPN achieved by the present invention in a low cost.

According to a first aspect of the present invention, there is provided ATM edge node switching equipment that is connected to plural user terminals in an ATM network. The ATM edge node switching equipment provides an IP (Internet protocol) data packet distribution function, which distributes each of IP data packets to each of the plural user terminals, by utilizing an IP-VPN (Internet protocol-virtual private network) function by using a destination IP address of each of the plural user terminals. And the IP-VPN function provides an inputted IP data packet analyzing section that obtains an input VC (virtual channel) number and also obtains a VPN-ID (virtual private network-identifier) for distinguishing each of the user terminals, a QOS (quality of service) type set by QOS information composed of a protocol type, a destination service port number, a source address service port number, and a code point, from a header part of the IP data packet transferred from one of the user terminals, and a routing information retrieving section that retrieves a routing of a VC for a destination address by using the destination IP address, the VPN-ID, and the QOS type, and sets the routing of the VC for the destination address.

According to a second aspect of the present invention, in the first aspect, a leased line between each of the plural user terminals and the ATM edge node switching equipment is at least one, and the leased line is a virtual private network of a layer 2 in an OSI (open system interconnection) referring model.

According to a third aspect of the present invention, in the first aspect, the inputted IP data packet analyzing section defines the QOS type as 8 types corresponding to discarding an illegal cell (IP data packet), tagging trouble, and transmission delayed time.

According to a fourth aspect of the present invention, there is provided ATM edge node switching equipment that is connected to plural user terminals in an ATM network, and is connected to one user terminal with at least one virtual leased line. The ATM edge node switching equipment provides an input VC (virtual channel) to which an IP data packet having a VPN-ID is inputted from each of the plural user terminals, an inputted IP data packet analyzing section for analyzing a header part of the inputted IP data packet, a user information memory that stores an input VC number, a VPN-ID, a QOS type set by QOS information composed of a protocol type, a destination service port number, a source address service port number, and a code point being a differentiated service, and that is used when the inputted IP data packet analyzing section analyzes the inputted IP data packet, a routing information retrieving section that retrieves and sets a routing of the IP data packet for the destination address based on a analyzed result at the inputted IP data packet analyzing section, and a routing information memory that stores a destination IP address, plural output VCs, an output VC state showing the state of the plural VCs, the QOS type, and the VPN-ID, and that is used when the routing information retrieving section retrieves and sets the routing. And the IP data packet is transferred to the destination address in the ATM network by changing the header part of the IP data packet.

According to a fifth aspect of the present invention, in the fourth aspect, the ATM edge node switching equipment further provides a VC control unit that always monitors a state of the VCs and notifies the state being a trouble or not to the routing information retrieving section when the routing information retrieving section retrieves and sets the routing, a network control unit that controls equipment connected to the ATM network and a congestion state of the ATM network, and a command analyzing section that analyzes commands from the network control unit.

According to a sixth aspect of the present invention, in the fourth aspect, the analyzed result at the inputted IP data packet analyzing section provides the VPN-ID and the QOS type, and the routing information retrieving section discards the IP data packet when the routing information retrieving section obtains the occurrence of some trouble in the VC base on the output VC state, and in case that plural output VCs exist to the destination address, the routing information retrieving section selects a suitable VC based on the priority and transfers the IP data packet to the destination address through the selected VC.

BRIEF DESCRIPTION OF THE DRAWINGS

The objects and features of the present invention will become more apparent from the consideration of the following detailed description taken in conjunction with the accompanying drawings in which:

FIG. 4 is a block diagram showing a structure of ATM edge node switching equipment shown in FIG. 3;

FIG. 5 is a diagram showing contents of user information in a memory for an IP-VPN function in a FS unit shown in FIG. 4;

FIG. 6 is a diagram showing contents of routing information in the memory for the IP-VPN function in the FS unit shown in FIG. 4;

FIG. 9 is a diagram showing the Internet network of the L3-VPN.

DESCRIPTION OF THE PREFERRED EMBODIMENTS

Figure 2:
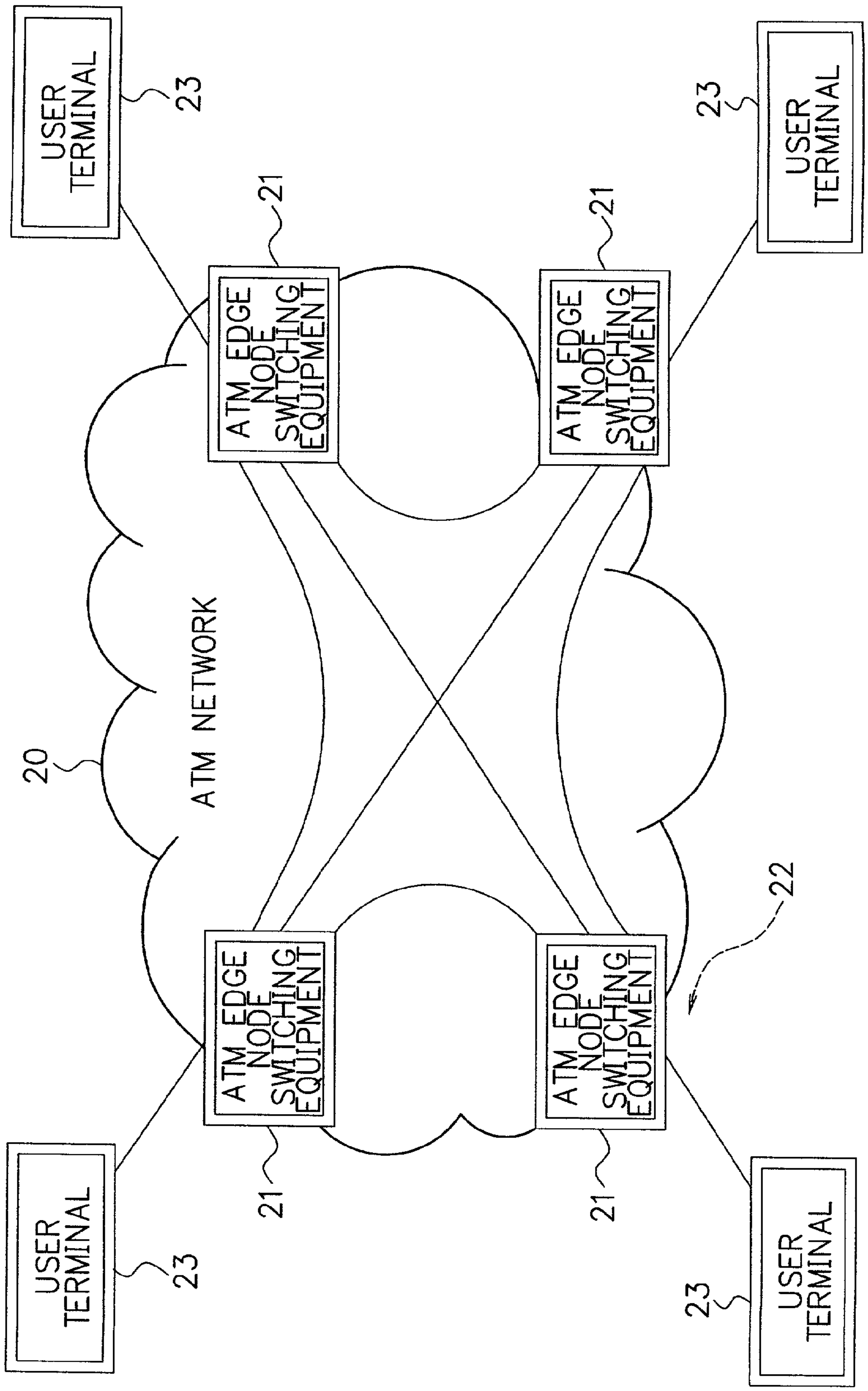
FIG. 2 is a diagram showing a structure of an embodiment of an ATM network of the present invention.

Referring now to the drawings, embodiments of the present invention are explained in detail. FIG. 2 is a diagram showing a structure of an embodiment of an ATM network of the present invention. As shown in FIG. 2, at the embodiment of an ATM network 20 of the present invention, plural ATM edge node switching equipment 21 is provided, and plural user terminals 23 are connected to each of the plural ATM edge node switching equipment 21 by a leased line 22. In order that each of the user terminals 23 subscribes to the ATM network 20, the ATM edge node switching equipment 21 installs a distribution function that distributes IP data packets by using an IP address of a destination every user terminal (hereinafter referred to as an IP-VPN function). With this installation, the connection between each of the plural user terminals 23 and each of the ATM edge node switching equipment 21 is reduced at least one leased line 22 as a virtual private network. Therefore, compared with a general leased line being the L2-VPN, the connection cost can be reduced, and the QOS equivalent to the L2-VPN can be obtained by the IP-VPN function.

Figure 3:
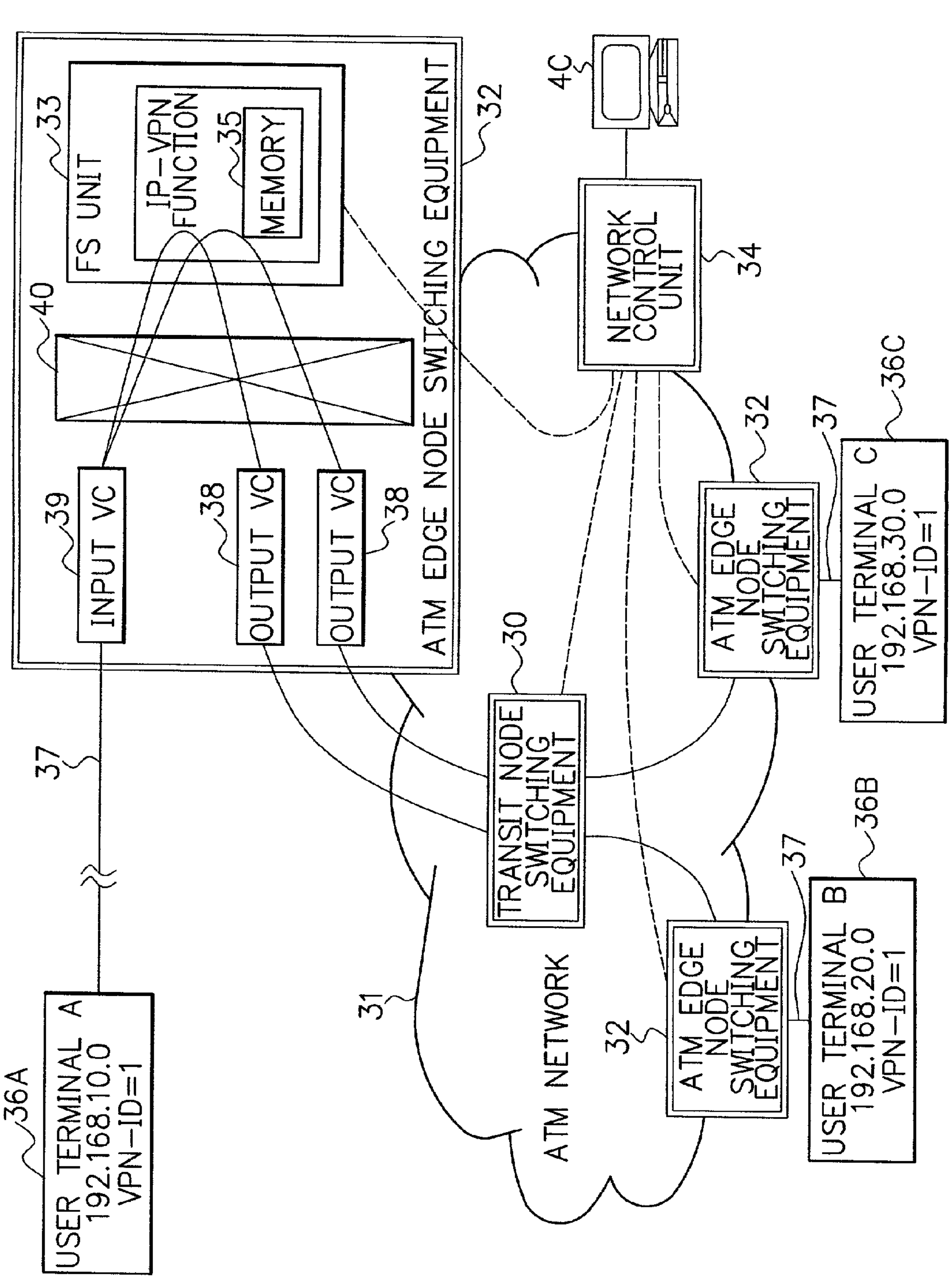
FIG. 3 is a block diagram showing a structure of the embodiment of the ATM network having an IP-VPN function of the present invention.

FIG. 3 is a block diagram showing a structure of the embodiment of the ATM network having the IP-VPN function of the present invention. In FIG. 3, the IP-VPN function operates at an IP data packet retrieval and transfer unit 33 (hereinafter referred to as a function server (FS) unit) installed in ATM edge node switching equipment 32 in an ATM network 31. And in FIG. 3, transit node switching equipment 30 connects to plural ATM edge node switching equipment 32 through a leased line or a public network being the Internet network. And the transit node switching equipment 30 deciphers a destination address transferred from one of the ATM edge node switching equipment 32. After this, the transit node switching equipment 30 exchanges the IP data packet being a 53 byte fixed length at the ATM network 31 transferred from one of the ATM edge node switching equipment 32 and transfers the exchanged IP data packet to the ATM edge node switching equipment 32 for the destination.

Each of the user terminals 36A, 36B, and 36C connects to one of the ATM edge node switching equipment 32 through a leased line 37 and has an address of the IP-VPN and an IP address. For example, as shown in FIG. 3, the user terminal 36A has addresses of a VPN-ID=1, and an IP=192.168.10.0, and the user terminal 36B has addresses of a VPN-ID=1, and an IP=192.168.20.0. In case that an IP data packet is transferred from the user terminal 36A to the user terminal 36C by the IP, the source addresses are made to be the VPN-ID=1, and the IP= 192.168.10.0, and the addresses of destination are made to be the VPN-ID= 1, and the IP=192.168.30.0.

A network control unit 34 connects to the transit node switching equipment 30 and the plural ATM edge node switching equipment 32, and monitors distribution of data in the ATM network 31 and controls so that the distribution is executed smoothly. For example, when the transit node switching equipment 30 had some trouble, the network control unit 34 controls so that the data are transferred to the user terminal 36C of the destination smoothly by making a detour through another transit node switching equipment (not shown).

Each of the plural ATM edge node switching equipment 32 consists of an input virtual channel (VC) 39 connected to the plural user terminals 36 through the leased lines 37, output virtual channels (VC) 38 connected to the transit node switching equipment 30 through plural leased lines, a switching section 40 having a switching and connecting function for the address of the destination such as a crossbar system and an electronic switching system and being a network connecting inside of the ATM edge node switching equipment 32, and the FS unit 33 having the IP-VPN function providing a memory 35 for the IP-VPN function.

The FS unit 33 in the ATM edge node switching equipment 32 has the following functions. A communication carrier operating and managing an ATM network has contracts with plural users, and in order to distinguish a specified user from the plural users in the network, the communication carrier utilizes the concept of VPN. The VPN signifies a general concept of a virtual private network in which a user uses the public network as if the public network is a leased line for the user. By using this concept, at the inside of the ATM network (hereinafter referred to as a core network), distinguishing the specified user from the plural users is executed by a VPN-ID36 set by a command. With this, one user network, that is, a user network, which is controlled by the network control unit 34 shown in FIG. 3, is defined to belong to one VPN. And VC information using by each user network and routing information for transferring an IP data packet are set by commands in the memory 35 for the IP-VPN function in the FS unit 33 in the ATM edge node switching equipment 32. These commands are set as arbitrary values by the control from a control terminal 4C of the network control unit 34.

In the routing information set in the memory 35 for the IP-VPN function in the FS unit 33 for transferring the IP data packet, output VC numbers 38 are set. Each of the output VC numbers 38 is an output VC number 38 for the destination IP address, or an output VC number 38, in which the destination IP address and an destination service port number by the TCP/UDP (transmission control protocol/user datagram protocol) are added. For example, by a retrieved result of the destination IP address, an ATM-CBR (constant bit rate) service is allocated to an IP data packet that is required to transfer with high priority, and an ATM-UBR (unspecified bit rate) is allocated to the other IP data packets. By mapping the QOS securing function for the communication at the ATM by the allocation mentioned above, the priority control, in which the priority transferring the IP data packet of any of the destination IP addresses is controlled, can be executed. With this, a desired QOS can be secured. And two output VC numbers can be set, and when the first output VC number has some trouble, the second VC number is selected.

In the core network, a normal PVC (permanent VC) connection is applied, and the IP-PVC function, in which the connection to the user network is executed through an IP interface, is utilized. By utilizing the IP-PVC function, the transferring process at an IP layer is not executed at the core network, therefore the subtraction of the TTL (time to live), which expresses possible amount of existing time of the IP data packet, is not executed. That is, even that transit node switching equipment 30 exists, the IP data packet is transferred through at 0 hop.

FIG. 4 is a block diagram showing a structure of the ATM edge node switching equipment 32 shown in FIG. 3. The ATM edge node switching equipment 32 provides an input VC-1 39 from which an IP data packet from a user terminal A 36A is inputted, an inputted IP data packet analyzing section 45 for analyzing a header part of the inputted IP data packet, user information 41 that is used when the inputted IP data packet analyzing section 45 analyzes the header part of the inputted IP data packet, a routing information retrieving section 46 that retrieves a routing to the destination address and sets the routing based on the analyzed result at the inputted IP data packet analyzing section 45, routing information 42 that is used when the routing information retrieving section 46 retrieves the routing, a VC control unit 48 that always monitors physical interface troubles of the VCs and notifies the monitored results to the routing information retrieving section 46 when the routing information retrieving section 46 sets the routing, and a command analyzing section 47 that analyzes commands from the network control unit 34. In this, the user information 41 and the routing information 42 are provided in the memory 35 for the IP-VPN function. The main functions of the FS unit 33 are two, that is, analyzing the inputted IP data packet and setting the routing to the destination address in the inputted IP data packet.

Next, referring to drawings, operation of the ATM edge node switching equipment 32 of the present invention is explained. In FIG. 4, in order to utilize the IP-VPN function, the user information 41 is set in the memory 35 for the IP-VPN function in the FS unit 33 in the ATM edge node switching equipment 32 from the control terminal 4C of the network control unit 34.

FIG. 5 is a diagram showing contents of the user information 41 in the memory 35 for the IP-VPN function in the FS unit 33 shown in FIG. 4. As shown in FIG. 5, for an input VC number 53 from a user terminal recognized at the ATM edge node switching equipment 32, a VPN-ID (identifier of virtual private network) 51 in which a user is distinguished at the core network and a QOS type 52 that sets a communication service level are set. The QOS type 52 is information in which information in QOS information 58 is combined and is utilized when a further detail priority control is executed for the IP data packet. The QOS information 58 is information combined a protocol type 54 of the TCP/UDP, a destination service port number 55, and a source address service port number 56, and further provides a code point 57. And the QOS type 52 is expressed by communication quality levels having parameters such as cell transmission delay time, a cell discarding rate, a cell error rate, and a priority control. And as shown in FIG. 5, for example, eight communication quality levels can be set, and setting the routing information is changed by the set value of the communication quality level.

Further, the code point 57, which is a differentiated service every IP data packet in one control domain, can be set. However, the code point 57 can not be combined with the protocol type 54, the destination service port number 55, and the source address service port number 56. And as mentioned above, the QOS type 52 has eight types for the input VC number.

FIG. 6 is a diagram showing contents of the routing information 42 in the memory 35 for the IP-VPN function in the FS unit 33 shown in FIG. 4. As shown in FIG. 6, a first output VC number 61 and a second output VC number 62 are set for a destination IP address 64, a VPN-ID 65, a QOS type 66 in the routing information 42. An output VC state 63 showing an operating state of an output VC is not set by a command, but is set by the routing information retrieving section 46 automatically. When any trouble does not occurs, the output VC state 63 describes "a first output VC". That is, when a command is set, "the first output VC" is definitely used first, and the operation is also started from "the first output VC", this defines that the default value is "the first output VC", this shows at 67 in FIG. 6. The operating state of each output VC is monitored by the VC control unit 48, when some trouble occurs, the VC control unit 48 notifies the trouble to the routing information retrieving section 46 immediately.

For example, when the first output VC has some trouble, the output VC state 63 is made to be "the second output VC", this shows at 68 in FIG. 6. With this, the transferring the IP data packet is automatically changed over to the second output VC. And when all set VCs have some trouble, the output VC state 63 is made to be "trouble" shown at 69 in FIG. 6, and the IP data packet is discarded.

The user information shown in FIG. 5 and the routing information shown in FIG. 6 are set in the memory 35 for the IP-VPN function from the control terminal 4C of the network control unit 34 through the command analyzing section 47.

Figure 7:
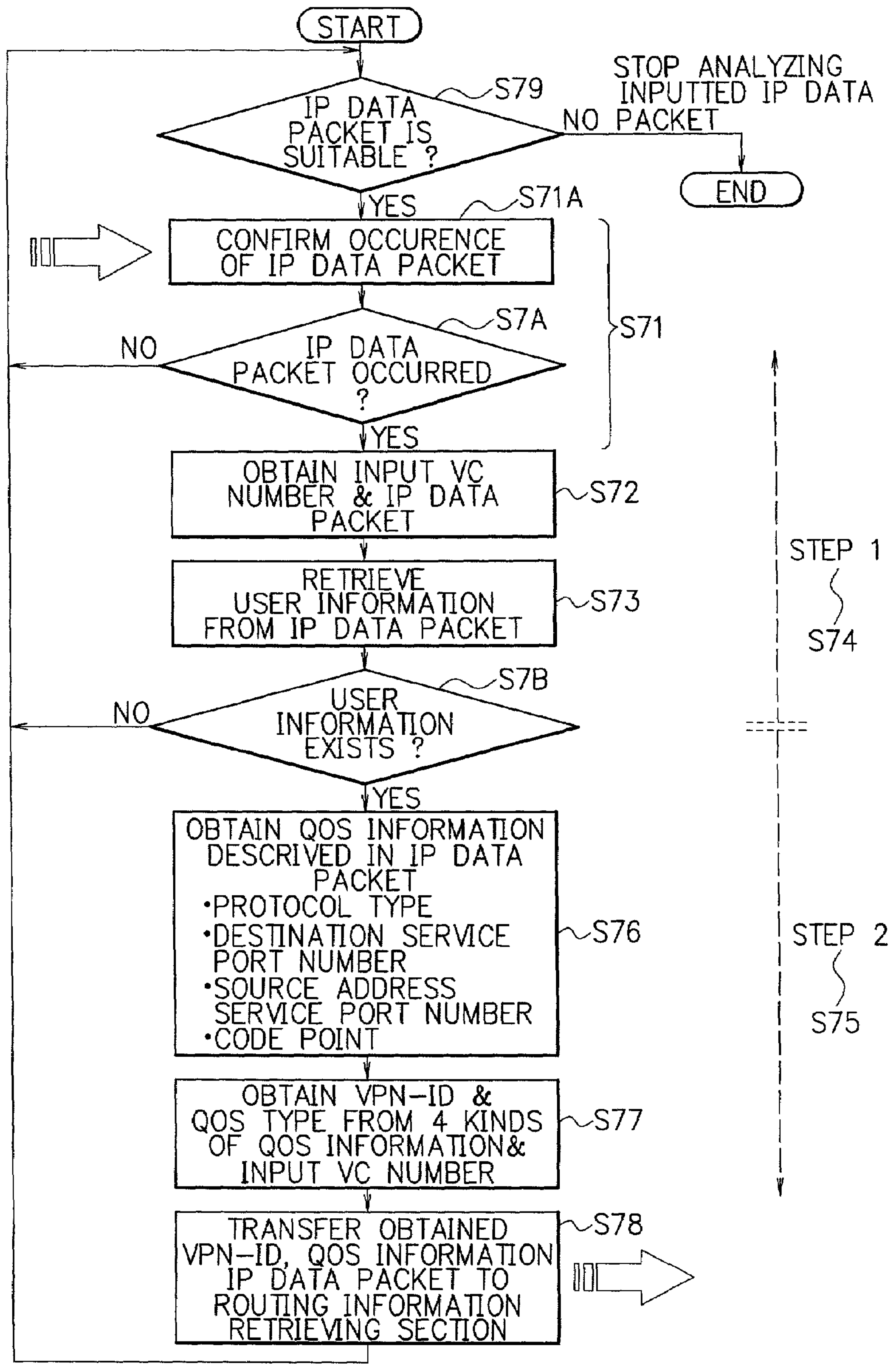
FIG. 7 is a flowchart showing inputted IP data packet analyzing processes at the IP-VPN function of the present invention.

FIG. 7 is a flowchart showing inputted IP data packet analyzing processes at the IP-VPN function of the present invention. Referring to FIGS. 4, 5, and 7, analyzing processes of an inputted IP data packet at the inputted IP data packet analyzing section 45 is explained. First, an IP data packet transferred from a user terminal is received at the input VC-1 39, and it is judged whether the inputted IP data packet is suitable to this ATM edge node switching equipment 32 or not (step S79). When the inputted IP data packet is not suitable to the ATM edge node switching equipment 32, the analysis of the inputted IP data packet is stopped (No at the step S79). When the inputted IP data packet is suitable to the ATM edge node switching equipment 32 (Yes at the step S79), the process goes to the analysis of the IP data packet at the inputted IP data packet analyzing section 45 (step 1, S74). Next, the occurrence of the IP data packet is confirmed at the inputted IP data packet analyzing section 45 (step S71A), and the occurrence of the IP data packet is confirmed (step S7A). When the IP data packet occurred (Yes at the step S7A), the inputted IP data packet analyzing section 45 obtains the input VC number and the IP data packet (step S72). After this, the input VC number is used as key data to retrieve user information, and the user information is retrieved by using this input VC number and the IP data packet (step S73). When the user information has not been set in the user information 41, the IP data packet is discarded (No at step S7B).

When the user information has been set in the user information 41 (Yes at the step 7B), the process goes to a step 2, S75. At the step 2, S75, as shown in FIG. 5, the QOS information 58, which is described in the IP data packet, provided the protocol type 54, the destination service port number 55, the source address service port number 56, and the code point 57 is obtained (step S76). And the user information is retrieved by using the QOS information 58 and the input VC number 53 obtained at the step 1, S75, and the VPN-ID 51 and the QOS type 52 are obtained (step S77).

The obtained VPN-ID 51, the QOS type 52, and the IP data packet are transferred to the routing information retrieving section 46 (step S78). With this operation mentioned above, the analyzing processes for the inputted IP data packet end.

Figure 8:
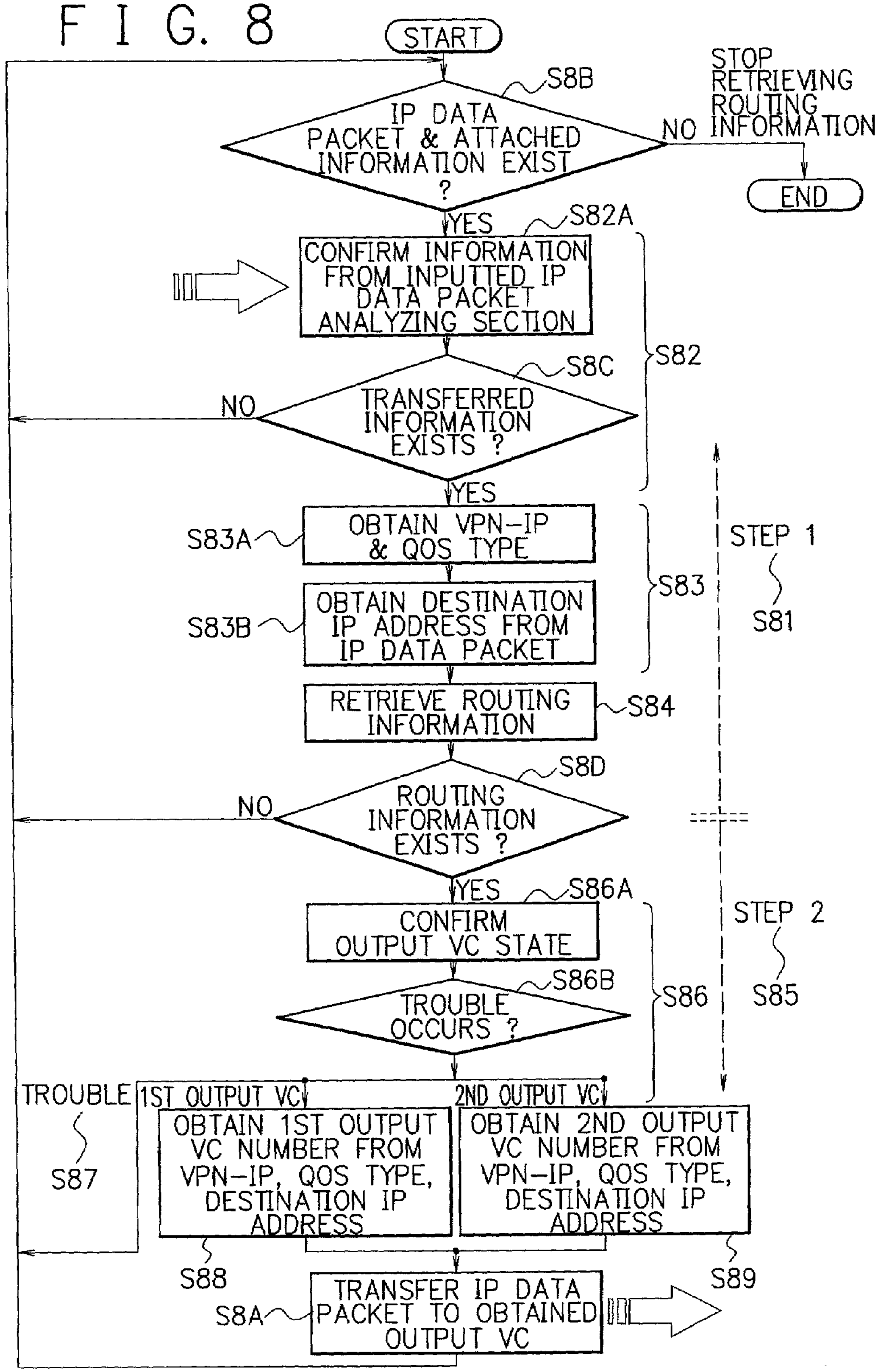
FIG. 8 is a flowchart showing routing information retrieving processes for the inputted IP data packet at the IP-VPN function of the present invention.

FIG. 8 is a flowchart showing routing information retrieving processes for the inputted IP data packet at the IP-VPN function of the present invention. Referring to FIGS. 4, 5, 7, and 8, retrieving processes for the inputted IP data packet at the routing information retrieving section 46 is explained.

First, the routing information retrieving section 46 receives the IP data packet and attached information being the VPN-ID 51 and the QOS type 52 from the inputted IP data packet analyzing section 45. And the routing information retrieving section 46 judges whether the information for retrieving exists or not (step S8B). When the information does not exist (No at the step S8B), the routing information retrieving is stopped. When the information exists (Yes at the step S8B), the process goes to a step 1, S81.

In the step 1, S81, the information transferred from the inputted IP data packet analyzing section 45 is confirmed at the routing information retrieving section 46 (step S82A). And when the transferred information is judged to be information from the inputted IP data packet analyzing section 45 (Yes at step S8C), the routing information retrieving section 46 obtains the VPN-ID 51 and the QOS type 52 from the transferred information (step S83A). Next, the destination IP address described in the IP data packet transferred from the inputted IP data packet analyzing section 45 is obtained (step S83B). And the VPN-ID 51, the QOS type 52, and the destination IP address are used as key data for retrieving, and routing information is retrieved for the inputted IP data packet (step S84).

Next, the operation goes to a step 2, S85, when the routing information has not been set in the routing information 42, the received IP data packet is discarded (No at step S8D).

When the routing information has been set in the routing information 42 (Yes at step S8D), the output VC state 63 is confirmed, and it is judged whether some trouble occurs or not in the output VC state (step S86B). When some trouble occurs, the IP data packet is discarded (step S87) and the operation returns to the S8B. And when the output VC state 63 is "the first VC", the first output VC number 61 is obtained by the VPN-ID 63, the QOS type 66, and the destination IP address 64 (step S88). And when the output VC state 63 is "the second VC", the second output VC number 62 is obtained by the VPN-ID 65, the QOS type 66, and the destination IP address 64 (step S89). After this, the IP data packet is transferred to the obtained output VC (step S8A). With this operation, the routing information retrieving operation ends.

Figure 1:
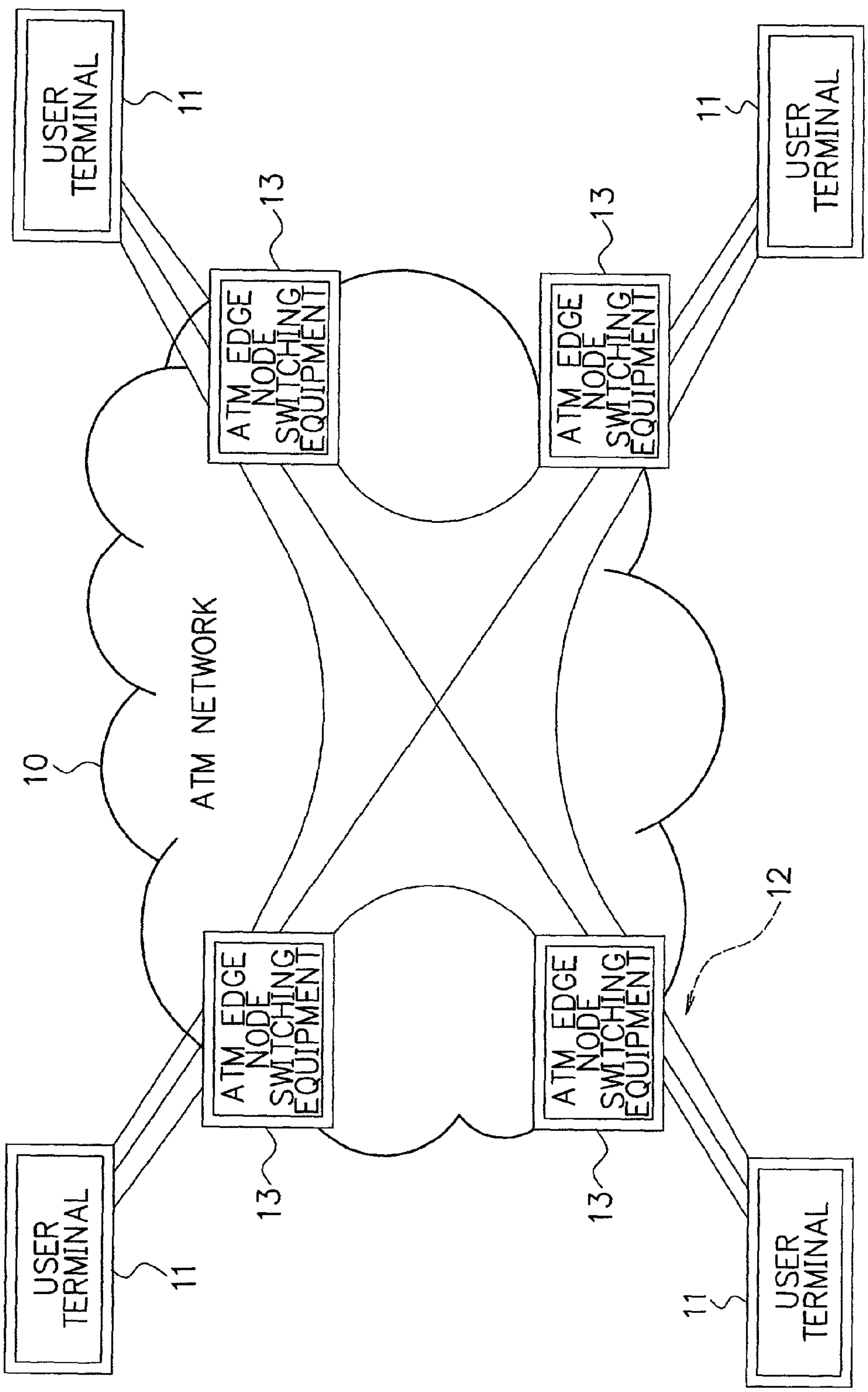
FIG. 1 is a diagram showing a conventional structure of an ATM network used the L2-VPN.

Next, anther embodiment of the present invention is explained. As a VPN utilized the Internet, in order to realize the IP-VPN, a conventional ATM network used the L2-VPN can be converted into an ATM network utilized the present invention. As shown in FIG. 1, at the conventional ATM network used the L2-VPN, each of user terminals 11 is connected to an ATM edge node switching equipment 13 through a mesh connection, and an IP data packet is transferred to a destination user terminal 11 by the L2-VPN. When the FS unit 33 being the IP-VPN function provided the inputted IP data packet analyzing section 45, the routing information retrieving section 46, the command analyzing section 47, and the memory 35 for the IP-VPN function shown in FIG. 4 is added to each of the ATM edge node switching equipment 13 shown in FIG. 1, the IP-VPN function can be worked.

In this system, there is an advantage that the quality assurance such as CBR/UBR (constant bit rate/unspecified bit rate) at an ATM level is possible. However, an IP data packet distribution function is not provided in the ATM edge node switching equipment 13, consequently, VCs of n (n-1)/2 lines connecting at mesh are needed among user terminals. Therefore, the cost is proportioned to the number of contracted lines.

FIG. 9 is a diagram showing the Internet network of the L3-VPN. As shown in FIG. 9, this network is the L3-VPN system that transfers an IP data packet on the Internet by utilizing NAT (network address translator) units 92 for translating a private IP address into a global IP address and an encryption function. In FIG. 9, ISPs (Internet service provider) A, B, and C 91 are connected to the Internet network 94 including the ATM network. And each of the ISPs are connected to user terminals 93 through the NAT in which an internal private address is made to correspond to a global address one by one at the address conversion in the LAN (local area network) and the encryption function by which data are encrypted for securing the security.

This L3-VPN system is realized by that a user contracts with an ISP and the system provides the NAT unit and the encryption function for the IP data packet, therefore this L3-VPN system has an advantage that the cost is lower than the L2-VPN system. The cost is an expense contracting with the ISP and an expense that the NAT unit and the encryption function are installed. However, the quality assurance executed at the ATM does not exist because the Internet is used, and the global IP address must be obtained.

As mentioned above, various standard models have been proposed corresponding to the expansion of the Internet network, and a network has been actually constructed as a defacto standard. At these circumstances, existing ATM edge node switching equipment can be converted into new ATM edge node switching equipment by adding the function provided in the FS unit 33 of the present invention in a low cost. With this, a transmission line between a user terminal and the ATM edge node switching equipment can be reduced by not increasing the mesh connection. As mentioned above, the present invention can be applied to a conventional existing network.

According to the present invention, one VC can connect a user terminal and ATM edge node switching equipment. Therefore, the cost can be reduced compared with the L2-VPN that connects all of user terminals with the mesh connection. Moreover, a mapping of the quality assurance such as the CBR/URB of the ATM can be applied to an IP data packet transferring through a core network every application service. Furthermore, transit node switching equipment is not needed to notify, because the IP data packet is transferred through by a 0 hop, therefore, the present invention can be used as a part of the user network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ATM (asynchronous switching mode) edge node switching equipment that is connected to plural user terminals in an ATM network, comprising:

an IP (Internet protocol) data packet distribution unit, which distributes IP data packets to each of said plural user terminals by utilizing an LP-VPN (Internet protocol-virtual private network) unit;

wherein said IP-VPN unit comprises:

an inputted IP data packet analyzing section that obtains an input VC (virtual channel) numbers, and also obtains a VPN-ID (virtual private network-identifier) for distinguishing each of said user terminals and a QOS (quality of service) type based on said input VC number and QOS information from a header part of an IP data packet transferred from one of said plural user terminals, said QOS information including a protocol type, a destination service port number, a source address service port number, and a code point; and a routing information retrieving section that retrieves an output VC number of an output VC to which said IP data packet is transferred based on a destination IP address in said IP data packet, said VPN-ID, and said QOS type.

2. The ATM edge node switching equipment in accordance with claim 1, wherein:

a leased line between each of said plural user terminals and said ATM edge node switching equipment is at least one, and said leased line is a virtual private network of a layer 2 in an OSI (open system interconnection) referring model.

3. The ATM edge node switching equipment in accordance with claim 1, wherein:

said inputted IP data packet analyzing section defines said QOS type as at least 3 types corresponding to discarding an illegal cell (IP data packet), tagging trouble, and transmission delayed time.

4. An ATM edge node switching equipment that is connected to plural user terminals in an ATM network, and is connected to a user terminal of said plural user terminals with at least one virtual leased line, comprising:

an input VC (virtual channel) to which an IP data packet is inputted from said user terminal;

an inputted IP data packet analyzing section for analyzing a header part of said IP data packet;

a user information memory that stores a VPN-ID, and a QOS in association with an input VC number and QOS information, said QOS information including a protocol type, a destination service port number, a source address service port number, and a code point, said user information memory being used when said inputted IP data packet analyzing section analyzes said IP data packet;

a routing information retrieving section that retrieves and sets a routing of said IP data packet for a destination address based on an analyzed result from said inputted IP data packet analyzing section; and a routing information memory that stores plural output VCs and an output VC state showing the state of said plural output VCs in association with a destination IP address, said QOS type, and said VPN-ID, and that is used when said routing information retrieving section retrieves and sets said routing;

wherein said IP data packet is transferred to said destination address in said ATM network by changing said header part of said IP data packet.

5. The ATM edge node switching equipment in accordance with claim 4, further comprising:

a VC control unit that always monitors a state of said plural output VCs and notifies said state having trouble or not to said routing information retrieving section when said routing information retrieving section retrieves and sets said routing;

a network control unit that controls equipment connected to said ATM network and a congestion state of said ATM network; and a command analyzing section that analyzes commands from said network control unit.

6. The ATM edge node switching equipment in accordance with claim 4, wherein said analyzed result from said inputted IP data packet analyzing section provides a determined VPN-ID and a determined QOS type, and said routing information retrieving section discards said IP data packet when said routing information retrieving section determines the occurrence of some trouble in an output VC for said IP data packet based on an obtained output VC state, and wherein, if more than one of said plural output VCs exists to said destination address, said routing information retrieving section selects a suitable VC based on a priority and transfers said IP data packet to said destination address through said selected VC.

* * * * *